(12) United States Patent
Karls

(10) Patent No.: US 9,377,135 B2
(45) Date of Patent: Jun. 28, 2016

(54) STACKABLE FASTENER

(71) Applicant: NMC GROUP, INC., Pomona, CA (US)

(72) Inventor: James D. Karls, Pomona, CA (US)

(73) Assignee: NMC GROUP, INC., Pomona, CA (US)

( * ) Notice: Subject to any disclaimer, the term of this patent is extended or adjusted under 35 U.S.C. 154(b) by 0 days.

(21) Appl. No.: 14/255,792

(22) Filed: Apr. 17, 2014

(65) Prior Publication Data

US 2015/0300532 A1 Oct. 22, 2015

(51) Int. Cl.
| F16L 3/127 | (2006.01) |
| F16L 3/22 | (2006.01) |
| F16B 19/10 | (2006.01) |
| F16B 27/00 | (2006.01) |

(52) U.S. Cl.
CPC ............. F16L 3/222 (2013.01); F16B 19/1081 (2013.01); F16L 3/127 (2013.01); F16B 27/00 (2013.01)

(58) Field of Classification Search
CPC ............. F16L 3/127; F16L 3/222; F16B 2/04
See application file for complete search history.

(56) References Cited

U.S. PATENT DOCUMENTS

| 2,542,142 | A | * | 2/1951 | Jennings ................. B44B 3/001 33/41.5 |
| 4,405,272 | A | * | 9/1983 | Wollar ................ F16B 19/1081 411/41 |
| 4,533,200 | A | * | 8/1985 | Wilson ................. H01R 4/2441 439/395 |
| 4,705,442 | A | | 11/1987 | Fucci |
| 4,757,664 | A | * | 7/1988 | Freissle ................. B07B 1/4645 16/2.1 |
| 4,867,691 | A | * | 9/1989 | Eck ........................ H01R 12/58 29/843 |
| 4,871,289 | A | * | 10/1989 | Choiniere ............. E04D 3/3603 411/41 |
| 6,045,309 | A | * | 4/2000 | LeVey ................. F16B 19/1081 411/349 |
| 6,511,028 | B1 | | 1/2003 | Gretz |
| 7,208,853 | B2 | | 4/2007 | Terrill et al. |
| 7,281,303 | B2 | | 10/2007 | Terrill et al. |
| 7,621,487 | B2 | | 11/2009 | Brown et al. |
| 7,686,259 | B2 | * | 3/2010 | Caveney ............. B60R 16/0215 211/85.5 |
| 7,758,502 | B2 | | 7/2010 | Phillips et al. |
| 7,770,852 | B2 | | 8/2010 | Caveney |
| 7,913,957 | B2 | | 3/2011 | Nelson et al. |
| 8,376,287 | B2 | | 2/2013 | Zhang |

FOREIGN PATENT DOCUMENTS

GB 2478772 A 9/2011

* cited by examiner

*Primary Examiner* — Jeanette E Chapman
(74) *Attorney, Agent, or Firm* — Russo & Duckworth, LLP; David G. Duckworth

(57) ABSTRACT

A stackable fastener is provided for mounting to a substrate having a non-threaded hole or for affixing to similar fasteners. The stackable fastener includes a body having a central bore, and a force member rotatable within the body's central bore. In addition, the fastener includes a plurality of fingers which extend axially from the fastener's body. Rotation of the force member causes the fingers to extend radially outward to lock within a substrate hole or within the central bore of a similar stackable fastener.

10 Claims, 10 Drawing Sheets

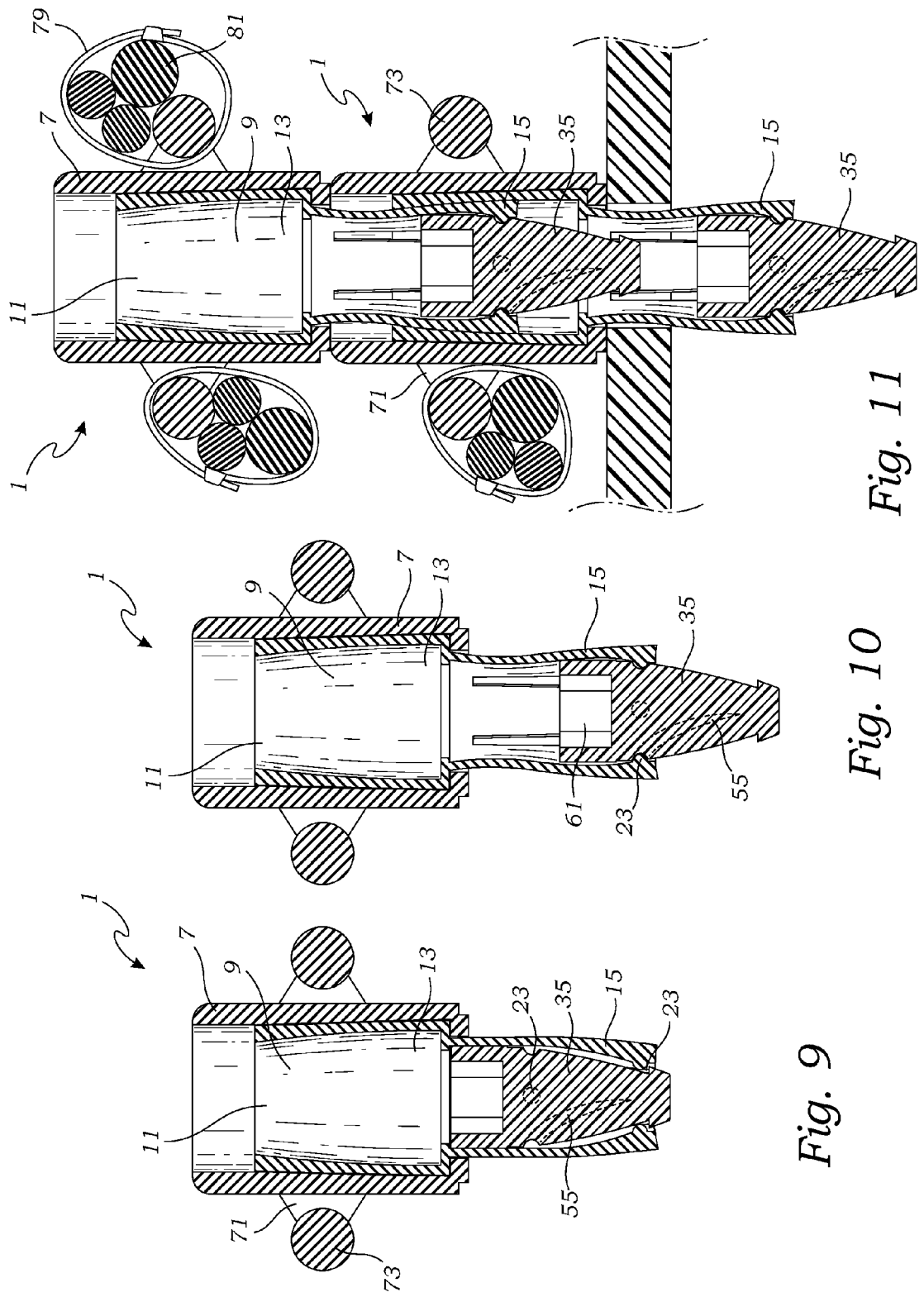

STACKABLE FASTENER

BACKGROUND OF THE INVENTION

The present invention relates to mounts and fasteners. More specifically, the present invention relates to mounts and fasteners for bundling and tying elongate objects such as electrical wires, tubes and hoses, and for securing such objects to a support.

Many types of mounting devices have been developed over the years for holding one or more elongate objects to a support. One of the more popular devices for use in vehicles, including automobiles and airplanes, has been the "P" clamp. The P clamp includes a metal strap formed into a generally circular portion with each end of the strap terminating in a flat foot portion. After elongate objects are encircled by the circular portion, the feet are overlapped until apertures in the feet are aligned to receive a threaded fastener. Unfortunately, P clamps suffer from numerous disadvantages. Foremost, P clamps are generally not adjustable so that when they are used in an environment where different sizes of bundles have to be accommodated, a large inventory of different sized P clamps must be maintained. Also, it is difficult to achieve a predetermined tension on the held objects, and thus it is sometimes necessary to use additional fillers to encircle the objects to provide consistent compressive forces. The P clamp has changed very little over the years which is surprising considering the various problems associated with their use. Most assemblers agree that the installation of these clamps is difficult because of their stiffness. Furthermore, the use of commercially available P clamps on electrical cables is complicated by the fact that electrical cable diameter dimensions are not tightly controlled and that cables have "soft" irregular cross-sections which can be damaged by excessive force caused by securing with a P clamp.

Relatively recently, ring post fasteners have been introduced into the aircraft industry. For example, U.S. Pat. No. 6,880,787 describes a ring post fastener which has a central post. On one end of the post is a female threaded attachment and at the other end of the post is a male threaded attachment. The male and female threads allow the fastener to be stacked. In addition, the ring post fastener has a plurality of spokes which radially project from the post and a ring affixed to the end of the spokes. U.S. Pat. No. 7,770,852 describes a ring post fastener wherein the ring is capable of freely rotating about the central post. Again, this fastener is stackable. Unfortunately, present ring post fasteners, as well as other fasteners, typically require that the fastener attach to a threaded substrate. However, not all underlying substrate surfaces have a male or female threaded feature.

Tie straps, also referred to as cable ties, have been widely used for bundling wires, and for securing such wires to a support. The tie strap structure includes a flexible tie for circling a bundle and a buckle at one end of the tie to lock the tie strap structure into a loop. Various mounts have been developed for securing the tie strap and bundle of wires to a support. The mounts include one or more windows or slots for receiving one end of the tie strap which is then looped back upon itself to be attached by the tie strap's buckle. The mounts are then affixed to a support surface by a threaded fastener or adhesive.

Advantageously, tie straps have adjustable diameters to accommodate a wide variety of bundle diameters. Accordingly, such fasteners typically do not require fillers to provide consistent compressive forces upon objects to be bundled. Unfortunately, presently available mounts for tie straps require that both sides of the mount be accessible for entry and exit of the strap. Further, such mounts require the additional component of an adhesive or of a threaded fastener to secure the mount to a support surface, thereby requiring that an additional inventory of components be maintained.

Accordingly, it would be advantageous to provide an improved fastener which was stackable, and which could mount to non-threaded surfaces.

Furthermore, it would be advantageous to provide an improved fastener and mount construction for bundling and securing elongate objects such as electrical wires and hoses.

Still an additional advantage to an improved fastener would be that the fastener was lightweight, inexpensive to manufacture, and did not require a large number of components.

SUMMARY OF THE INVENTION

The present invention addresses the aforementioned disadvantages by providing an improved fastener which is capable of stacking and which is capable of affixing to a substrate's non-threaded hole.

The stackable fastener includes a body having a central bore defining a central axis. Preferably, the body is cylindrical so as to form an annular construction. The bore has first and second ends, which for convenience, are referred to herein as a distal end and a proximal end. The body's central bore is tapered so as to have a diameter smaller at the bore's proximal end than towards the bore's distal end. In addition, the stackable fastener has a plurality of flexible fingers which extend axially and distally from the body's distal extremity and which are positioned concentrically about the central bore's central axis. The stackable fastener may have any number of fingers. However, it is believed that at least two fingers are required, and at least three fingers are preferred. Preferably, the fingers are constructed to be thicker at their distal ends than their proximal ends.

The stackable fastener further includes a force member which is positioned within the fastener's central bore and within the central area between the concentrically positioned fingers. The force member is constructed to force the fingers radially outward when rotated to a first position. However, the force member allows the fingers to retract inwardly when the force member is rotated to a second position.

The stackable fastener's force member may be constructed in different ways to force the fingers radially outward. In a first embodiment, the force member has a substantially cylindrical construction except that its distal extremity is constructed as a cam so as to include a plurality of radially projecting projections. This "cam" embodiment is rotatable within the body's central bore, but not axially movable. The cam's projections are sized and positioned to reside within spaces between the stackable fastener's fingers when the fingers are not intended to be forced outward. However, rotation of the cam force member causes the projections to engage the fingers so as to force the fingers outwardly. Moreover, preferably the force member includes a detent and the stackable fastener's body includes a notch positioned for locking the force member into its rotational position so as to lock the fingers radially outward. Moreover, the fingers may include notches to receive the cam's projections to provide additional locking capability. Rotation of the force member can be accomplished by various constructions known to those skilled in the art. In a preferred embodiment, the force member includes a hexagonal recess formed into the force member's upper surface so as to accept a hexagonal tool. Other constructions, including slots for screwdrivers, are also acceptable.

In a second embodiment, the stackable fastener's force member is constructed in the form of a "plunger" which is rotatable and axially slideable within the central bore and fingers. Preferably, the plunger has a tapered construction wherein the plunger is tapered so as to have a wider cross-section at its proximal end than its distal end. The preferred shapes for the plunger include a conical shape or elliptical conical shape, though other shapes can also be adopted as can be selected by those skilled in the art. As a result of the plunger's tapered construction and fingers having an increased thickness at their distal extremity, the plunger's movement in the distal direction causes the plunger to engage and push the fingers radially outward. Preferably, the fingers are biased inward due to the inherent properties of the material that the fingers are made with so that when the plunger is moved proximally in the central bore to a proximal position the fingers will return inwardly to an unstressed or less stressed conditioned.

Advantageously, the stackable fastener is constructed to affix to a substrate having a hole sized for receipt of the fastener fingers when the force member is rotated to a position that the fingers are biased inwardly. However, where the hole is dimensioned correctly, the force member and fingers are sized to lock the stackable fastener to the substrate when the force member is rotated so as to move the fingers outward. In addition, the stackable fastener of the present invention is constructed to stack upon itself. To this end, the fingers, force member and tapered bore are constructed so that the stackable fastener of the present invention can be stacked upon a like fastener. This is accomplished by inserting the fingers of one stackable fastener into the central bore of a similar stackable fastener when the first fastener's force member is rotated so that the fingers are positioned inward. However, the force member and fingers are sized so that the fingers expand radially within the second stackable fastener's central bore when the first stackable fastener's force member is rotated so as to force the first stackable fastener's fingers radially outward.

Preferably, the stackable fastener is constructed in the form of a ring-post fastener wherein the stackable fastener's body forms a post having first and second ends which defines the fastener's longitudinal axis. A plurality of spokes radially project from the post's longitudinal axis. Further, this ring-post fastener embodiment of the present invention includes a ring concentrically aligned with the fastener's post which is affixed in place by the fastener's spokes, in similar manner to a bicycle wheel construction. The separation between spokes creates a plurality of slots with each slot's periphery defined by the fastener's post, adjacent spokes and ring. The plurality of slots are sized for receipt and passage of a conventional tie strap.

In a preferred embodiment of the invention, the ring-post fastener embodiment includes four radially projecting spokes which create four equal sized slots, with each slot sized for receipt of a conventional tie strap. Though the ring-post fastener embodiment is described herein as including four spokes, the fastener may include more or less spokes depending on the size and use of the fastener without departing from the spirit or scope of the invention.

Thus, an advantage of the present invention is to provide an improved fastener which is stackable to similar fasteners, and which can mount to non-threaded surfaces.

Still an additional advantage of the present invention is to provide an improved fastener and mount construction for bundling and securing elongate objects such as electrical wires and hoses.

Still an additional advantage of the present invention is providing an improved fastener that the fastener is lightweight, inexpensive to manufacture, and does not require a large number of components.

Still an additional advantage of the present invention is to provide a ring-post fastener that does not require the use of additional bolts or washers to affix the fastener to a support surface.

Other features and advantages of the present invention will be appreciated by those skilled in the art upon reading the detailed description which follows with reference to the attached drawings.

BRIEF DESCRIPTION OF THE DRAWINGS

FIG. 9 is a side cross-sectional view of the stackable fastener illustrated in FIG. 7B;

FIG. 10 is a side cross-sectional view of the stackable fastener illustrated in FIG. 7C;

FIG. 11 is a side cross-sectional view of a pair of stackable fasteners affixed together and mounted to a substrate in accordance with FIG. 8;

DETAILED DESCRIPTION OF THE INVENTION

Figures 1, 2A:
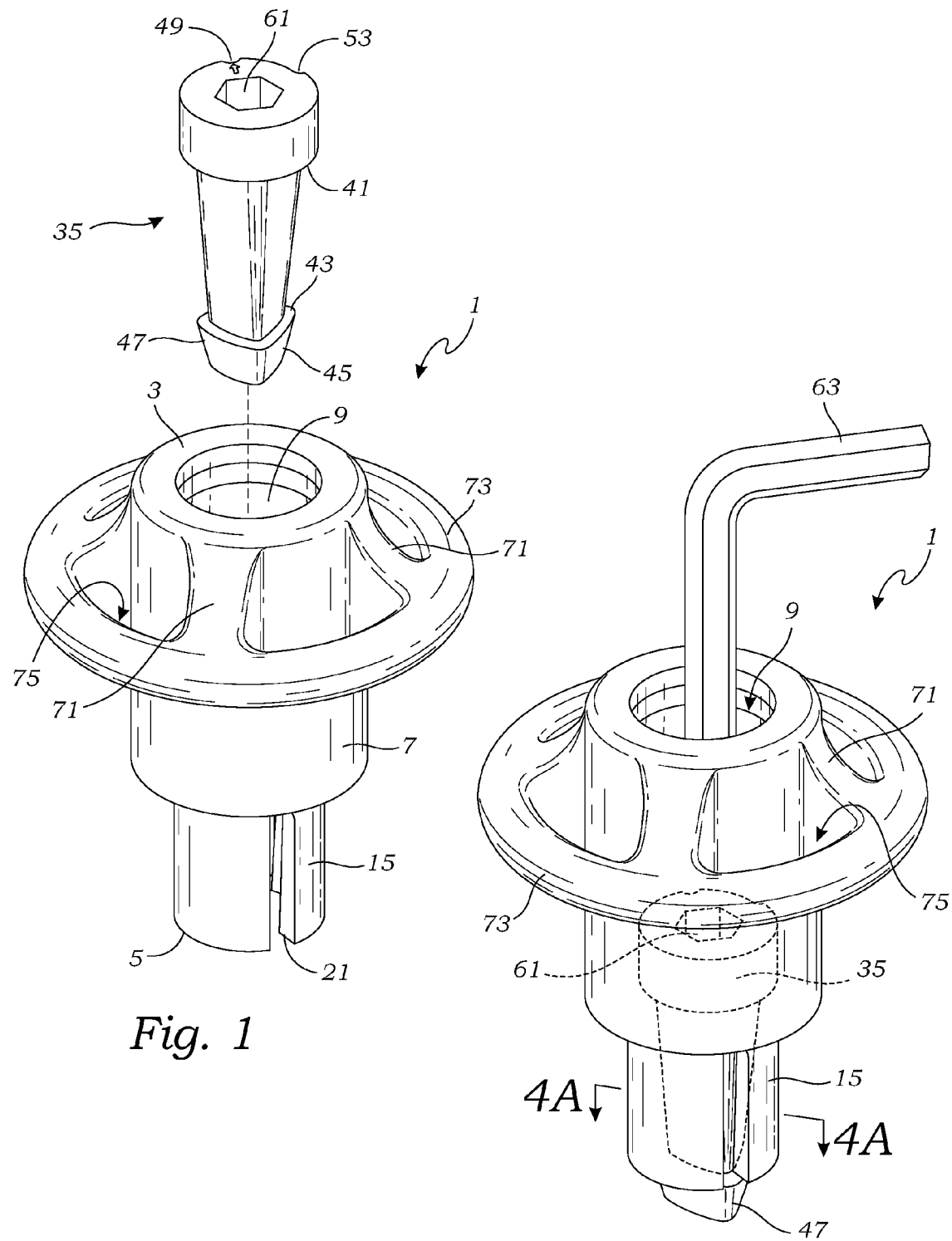
FIG. 1 is an exploded perspective view of a first embodiment of the stackable fastener of the present invention.
FIG. 2A is a perspective view of the stackable fastener of FIG. 1 illustrating its use with a hexagonal tool.
Figure 2B:
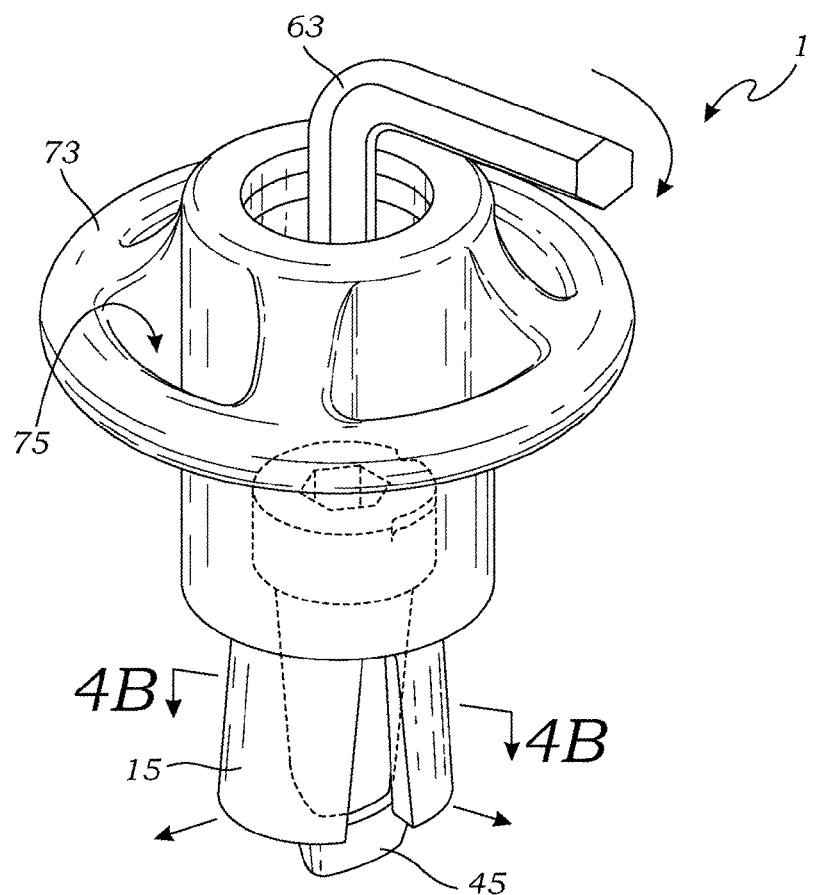
FIG. 2B is a top perspective view illustrating the stackable fastener's force member being rotated so as to force fingers radially outward.

While the present invention is susceptible of embodiment of various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to the figures, the stackable fastener 1 of the present invention includes a body 7 and fingers 15. The body is generally cylindrical and has a substantially cylindrical central bore 9. As illustrated in FIGS. 3A, 3B, and 9-11, the central bore 9 has a proximal end 11 and a distal end 13. Furthermore, its is preferred that the central bore is tapered so as to have a diameter smaller at the bore's proximal end 11 than at the central bore's distal end 13. Meanwhile, the stackable fastener's fingers 15 extend distally from the body's distal end. The fingers are preferably of equal length and are positioned concentrically about the stackable fastener 1.

Figure 3A:
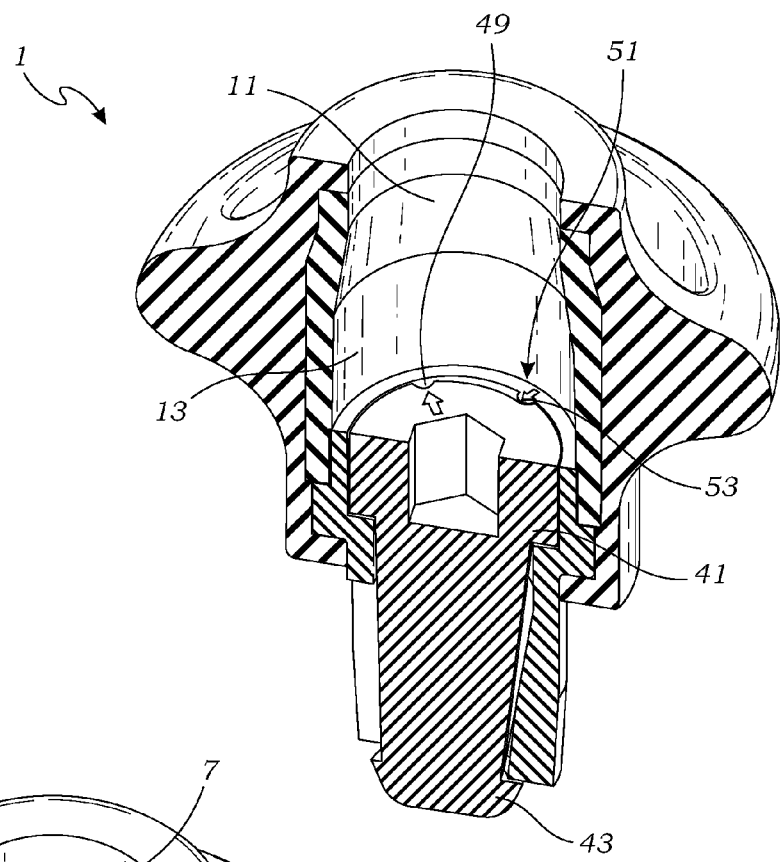
FIG. 3A is a top perspective cut-away view illustrating the stackable fastener's force member rotated to allow the fingers to retract inwardly.
Figure 3B:
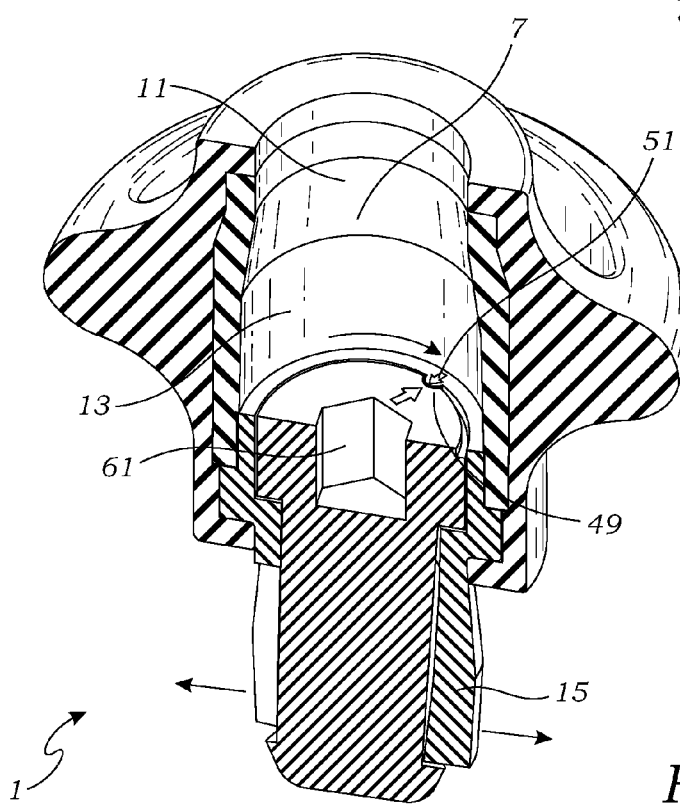
FIG. 3B is a top perspective cut-away view illustrating the stackable fastener's force member rotated so as to force fingers radially outward and illustrating the force member including a notch to accept a detent to lock the force member in place.
Figure 4A:
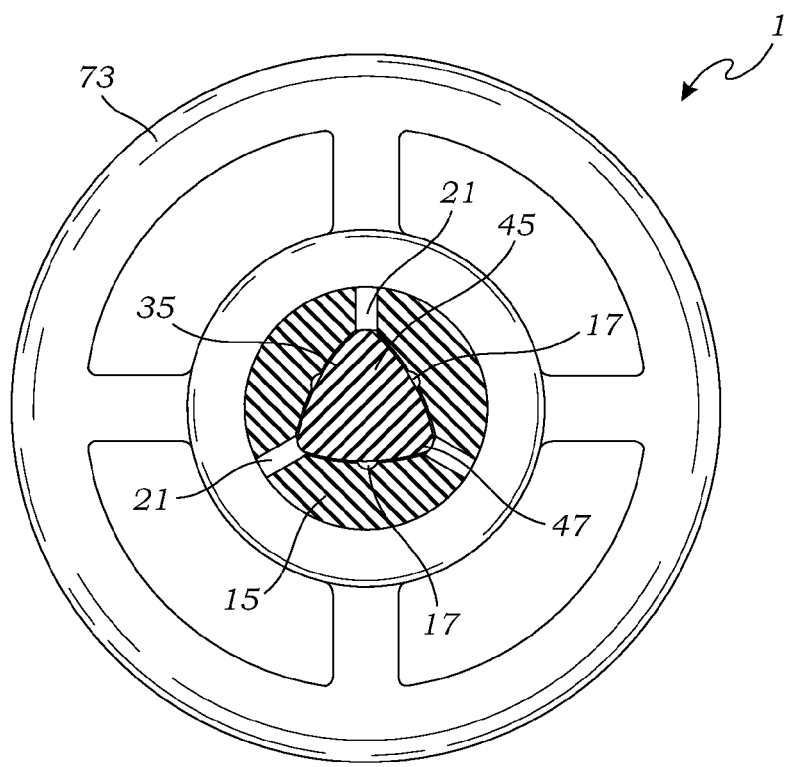
FIG. 4A is a bottom cut-away view illustrating the force member rotated to a position so as to allow the stackable fastener's finger to retract inwardly.
Figure 4B:
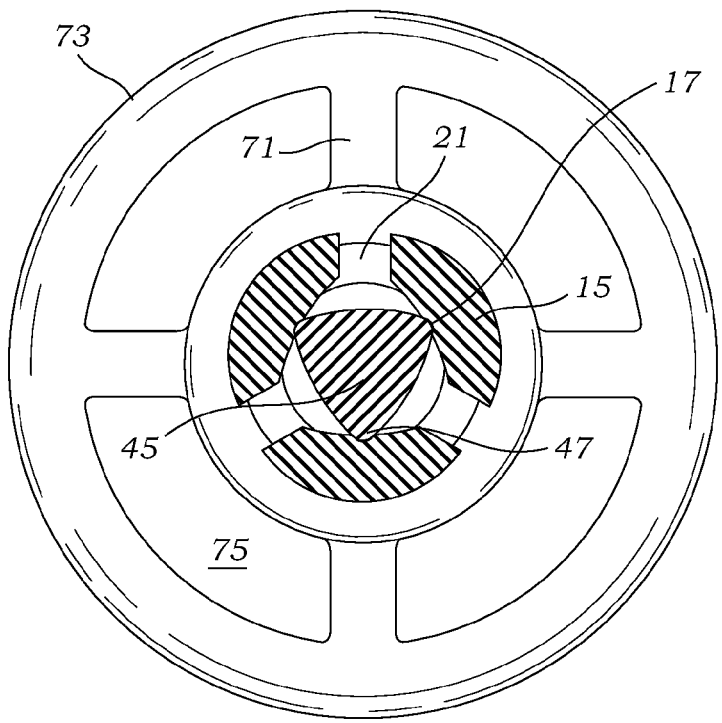
FIG. 4B is a bottom cut-away view illustrating the force member rotated so as to force the stackable fastener's fingers radially outwardly and illustrating the fingers including notches to lock the force member in place.
Figures 5, 6A:
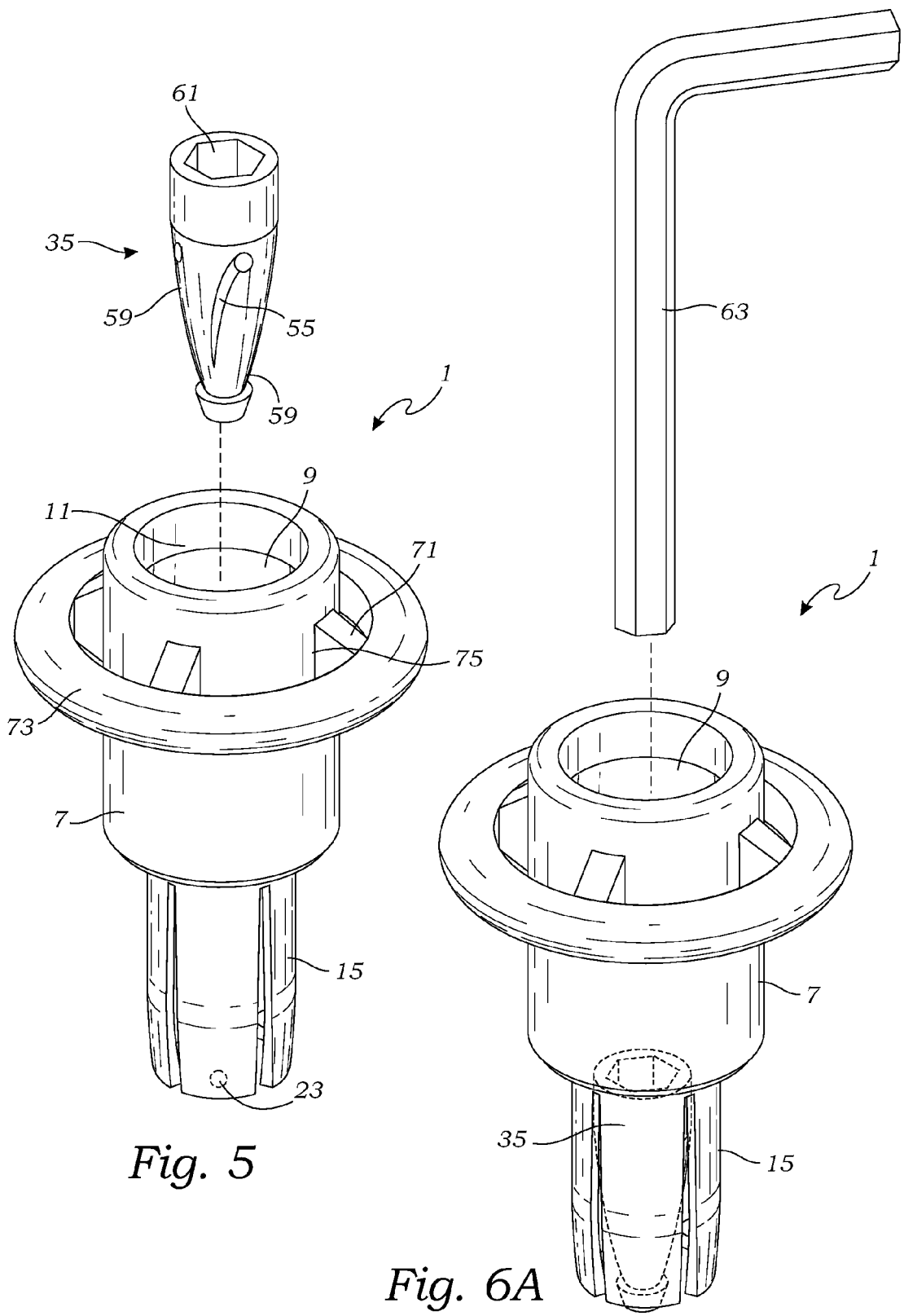
FIG. 5 is a top exploded perspective view of a second embodiment of the stackable fastener of the present invention.
FIG. 6A is a top perspective view of the stackable fastener illustrated in FIG. 5 illustrating its use with a hexagonal tool.

In addition, the stackable fastener 1 includes a force member 35. The force member is provided so as to controllably force the fingers 15 radially outward, or allow the fingers to retract radially inward. The force member 35 is positioned within the fastener's central bore 9 and extends axially between the fingers 15. In a first embodiment illustrated in FIGS. 1-4, the force member 35 has a cylindrical proximal end for rotating within the fastener's cylindrical central bore 9. In addition, the force member includes a cam 45 which forms the distal end of the force member 35. The cam 45 includes a plurality of projections 47 wherein the cam has the same number of projections as the stackable fastener has fingers 15. As best illustrated in FIG. 4A, the projections 47 are configured so as to reside within the spaces 21 between the fingers so as to not force the fingers radially outward. As best illustrated in FIG. 4B, the rotation of the force member 35 within the central bore 9 causes the projections to move out of the spaces 21 so as to engage the inner surfaces of the fingers 15. As illustrated in the figures, a preferred stackable fastener includes three fingers 15 and the cam 45 includes a corresponding three projections.

Preferably, the stackable fastener 1 includes a mechanical structure for locking the force member 35 when the force member has forced the fingers radially outward. In a preferred embodiment, this lock is accomplished by providing each of the fingers with notches 17 sized to receive the projections 47. (See FIGS. 4A and 4B). In still an additional embodiment illustrated in FIGS. 3A and 3B, the force member 35 includes an upper shoulder 41 and a lower shoulder 43 for preventing removal of the force member from the stackable fastener's central bore 9. In addition, the force member includes a notch 49 for receiving a detent 51 which, as illustrated in FIG. 3B, projects into the force member notch 49 so as to rotationally lock the force member in place so as to lock the fingers radially outward. Also preferable, the force member includes a stop 53 to engage the body detent 51 to limit rotation of the force member within the central bore when the force member is rotated to position the force member's projections between the fingers so as to cause the fingers to retract radially inward.

Figures 6B, 6C:
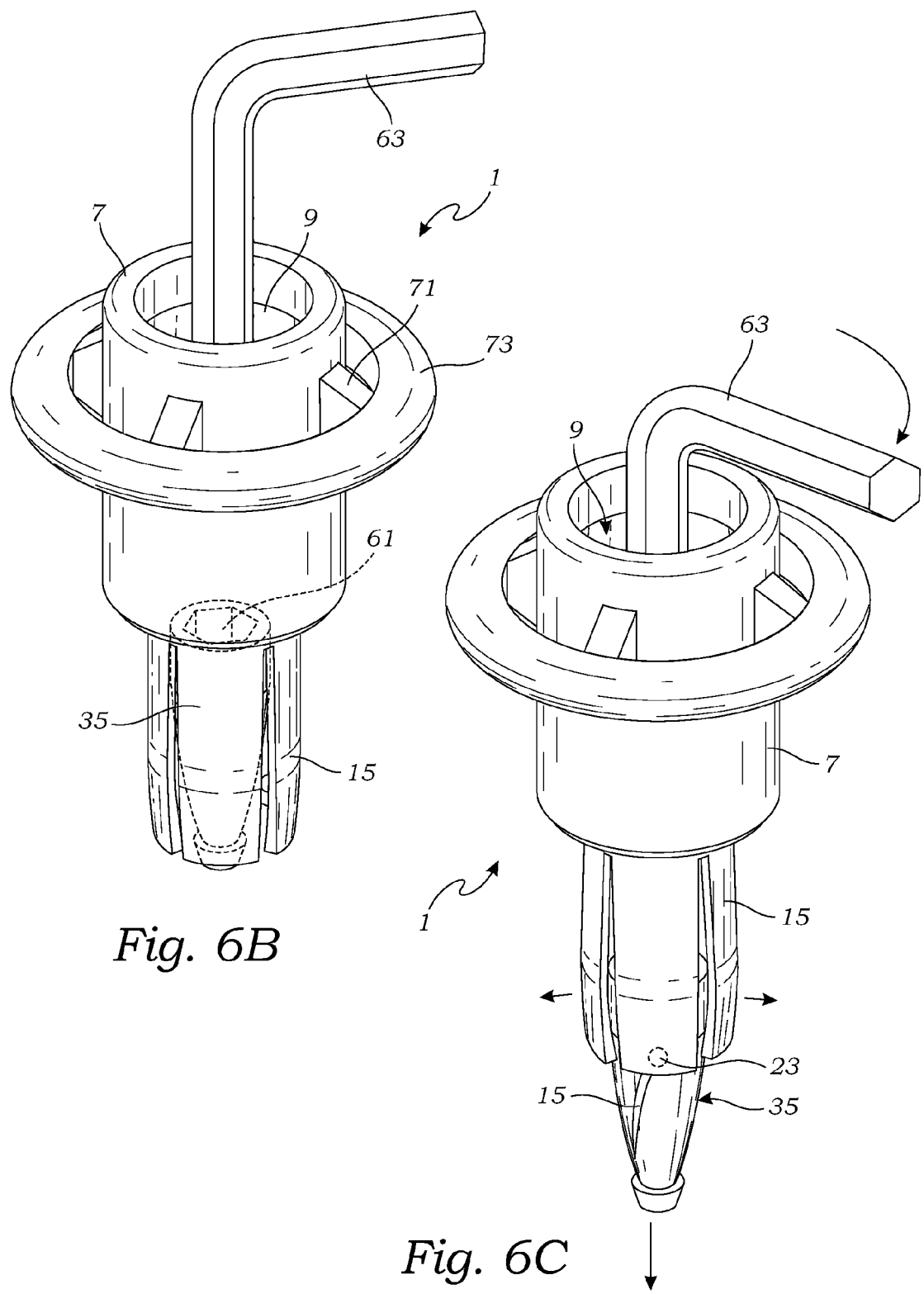
FIG. 6B is a top perspective view of the stackable fastener illustrated in FIG. 5 wherein the force member has been rotated so as to allow the stackable fastener's fingers to retract inwardly.
FIG. 6C is a top perspective view of the stackable fastener illustrated in FIG. 5 wherein the force member has been rotated to a position forcing the stackable fastener's fingers radially outward.

As understood by those skilled in the art, for the stackable fastener embodiment of FIGS. 1-4, the force member is rotatable within the stackable fastener's central bore, but not movable axially with respect to the stackable fastener's body. In a second embodiment of the present invention, the stackable fastener's force member is constructed to move axially as the force member is rotated. With reference to FIGS. 5-11, the force member 35 has a cylindrical proximal region and a tapered distal region 59 which has a wider cross-section toward the proximal end of the force member 35 than at its distal end. In addition, the force member includes one or more spiral slots 55. In an embodiment not shown, the force member includes a single spiral slot 55 which winds itself helically upon the tapered distal region of the force member. However, in a preferred embodiment illustrated in FIGS. 5-6, the force member 35 includes four arcuate slots 55. Each of these slots are sized to receive nubs 23 which project radially inward from the distal ends of the fingers 15. Rotation of the force member within the stackable fastener's central bore 9 causes the force member to travel upwardly or downwardly as the nubs 23 travel within the slots 55. Rotation is preferably accomplished using a hexagonal tool 63 fitted within a hexagonal recess 61 formed in the top surface of the force member. As illustrated in FIGS. 6B and 6C, rotation of the force member causes the force member to move distally with the force member's tapered surface 59 forcing the fingers 15 radially outward. Preferably, the fingers 15 can be locked radially outward by providing the force member's slot 55 with a circular recess for receiving the finger's nub 23.

Figures 12, 13:
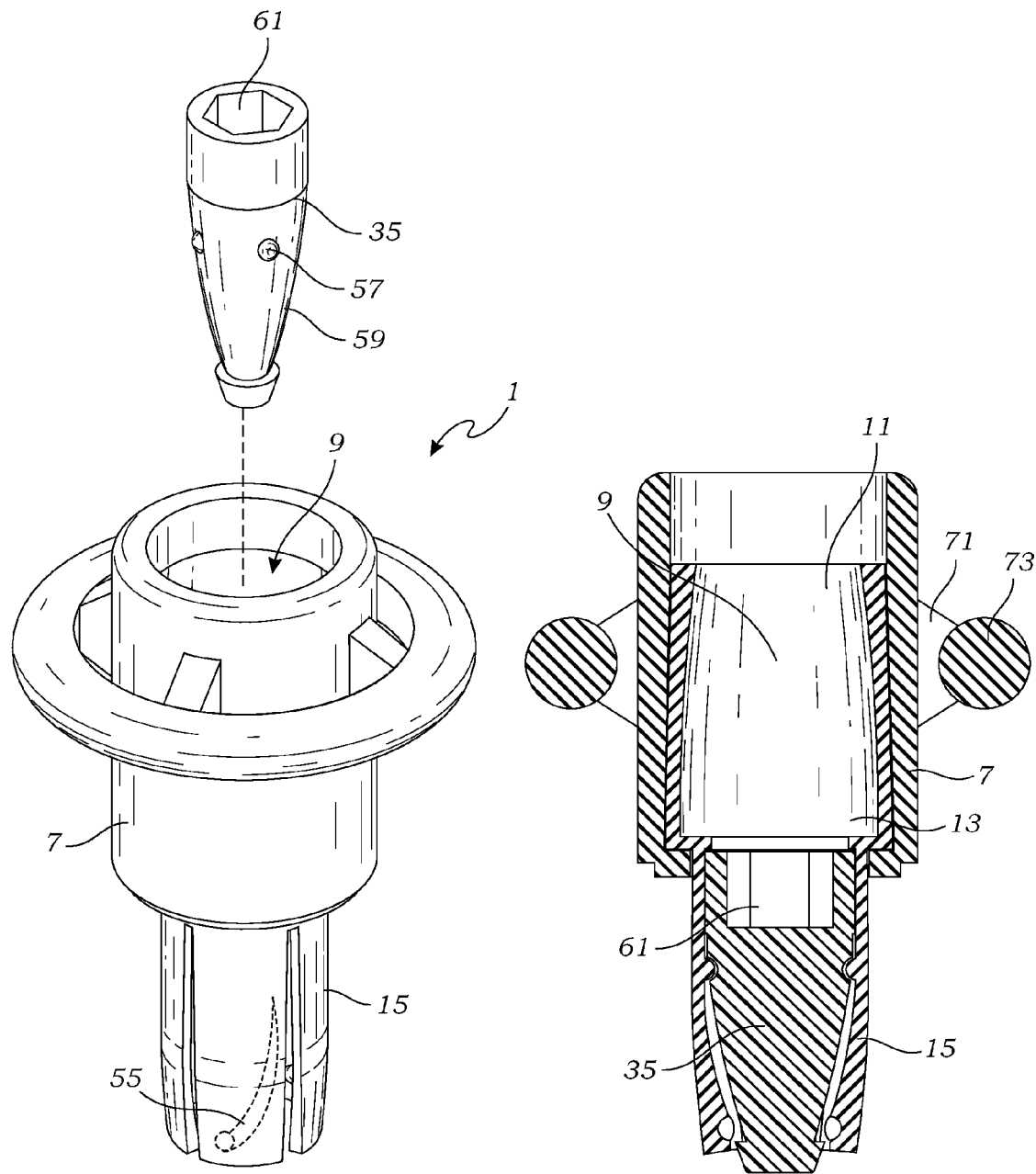
FIG. 12 is an exploded top perspective view of a third embodiment of the stackable fastener of the present invention.
FIG. 13 is a side cross-sectional view of the stackable fastener illustrated in FIG. 12.

In still an additional third embodiment of the present invention, the stackable fastener includes a force member substantially similar to that described above and illustrated in FIGS. 5-7. However, as illustrated in FIGS. 12 and 13, instead of a force member 35 including a spiral slot 55 for receiving nubs 23 which project inwardly from the fingers, the slots and nubs are reversed so that the slots 55 are formed into the fingers 15 and the nubs 57 project outwardly from the force member's exterior. As illustrated in FIGS. 12 and 13, the force member nubs 57 project into the finger slots 55 such that rotation of the force member 35 causes the force member to move upwardly or downwardly in a spiral manner in accordance with the path of the slots 55. As with other embodiments, movement of the force member in the proximal direction causes the fingers to retract, but movement of the force member in the distal direction forces the fingers radially outward.

Figure 7A:
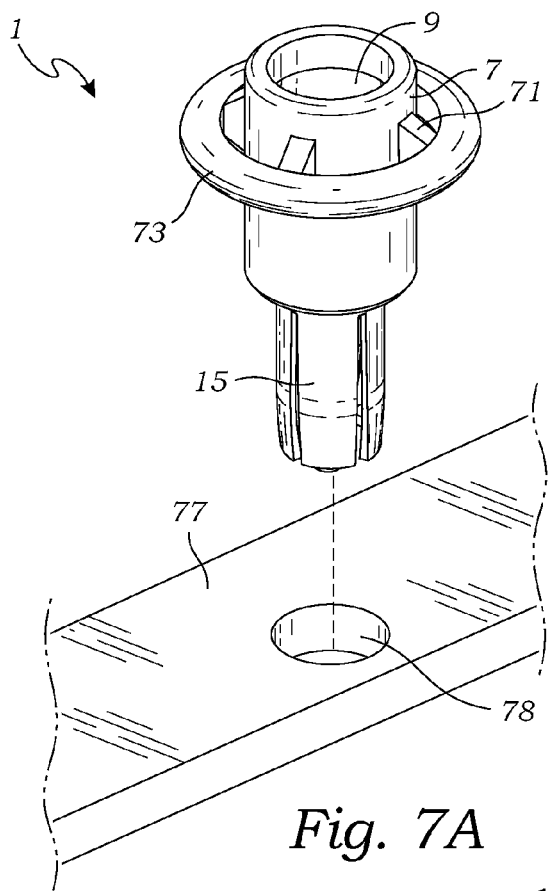
FIG. 7A is a top perspective view illustrating a stackable fastener of the present invention wherein its fingers are positioned radially inward prior to insertion into a substrate hole.
Figure 7B:
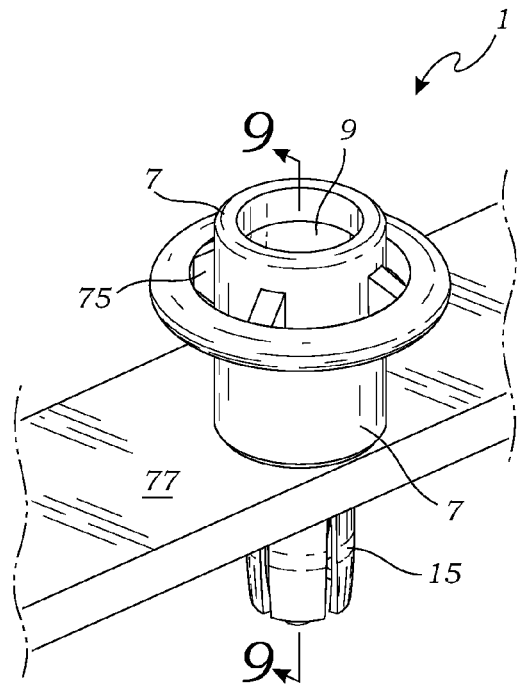
FIG. 7B is a top perspective view illustrating a stackable fastener of the present invention wherein its fingers are positioned radially inward, but have been projected through a substrate hole.
Figure 7C:
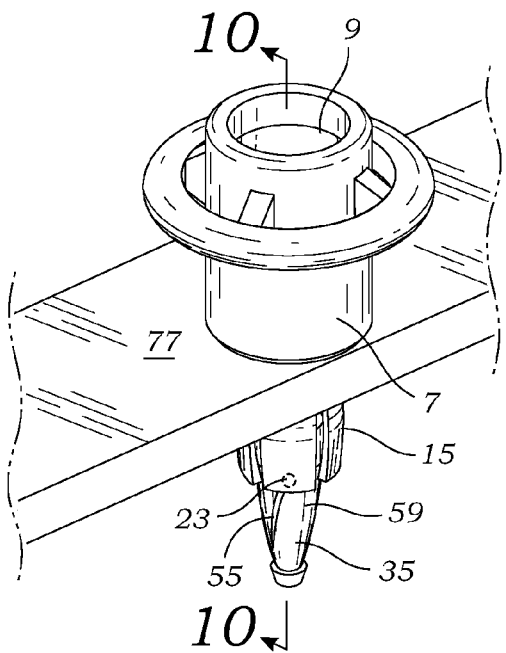
FIG. 7C is a top perspective view illustrating the stackable fastener of FIG. 7B wherein the force member has been rotated so as to force the stackable fastener fingers radially outward to lock the fastener to a substrate.

As illustrated in FIGS. 7A-7C, the stackable fastener 1 is constructed to affix to a substrate 77 having a hole 78. The hole 78 must be properly sized so as to be sufficiently large to receive the fastener's fingers 15 when the fingers are retracted inward, as illustrated in FIGS. 7A and 7B. However, the hole 78 must be sized sufficiently small so as to prevent disengagement of the fastener 1 from the substrate 77 when the force member 35 has forced the fastener's fingers 15 radially outward. In addition, as illustrated in FIGS. 8-11, the stackable fastener's central bore 9 is sized to receive a similar fastener's fingers 15. Again, the central bore is sized to receive the fingers 15 when the fingers have been retracted radially inward. However, the central bore's size and tapered shape prevent removal of the fingers from the central bore, and a resulting disengagement of stackable fasteners, when the force member has been rotated so as to force the fingers 15 radially outward, as illustrated in FIG. 11. Advantageously, the stackable fastener can be affixed to a substrate 77, or any number of stackable fasteners can be stacked on top of one another.

Figure 8:
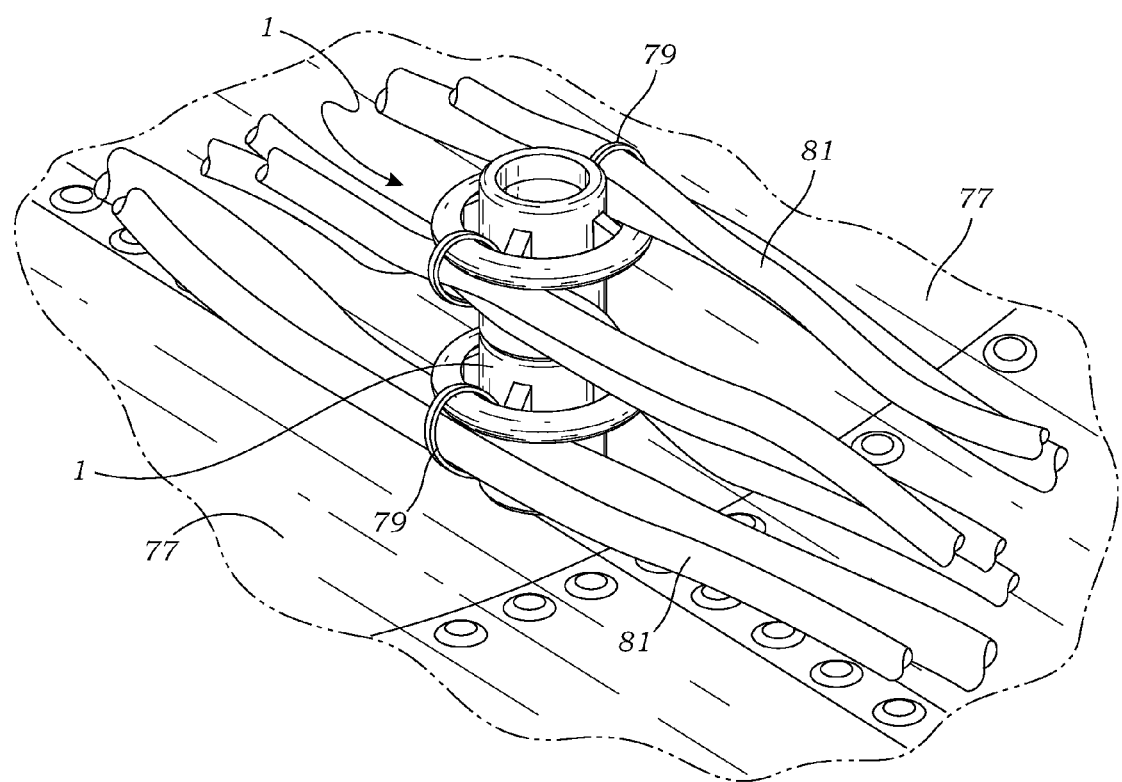
FIG. 8 is a top perspective view illustrating two (2) stackable fasteners of the present invention stacked together and mounted to a substrate.

As illustrated throughout FIGS. 1-13, the preferred stackable fastener 1 includes four spokes 71 which extend radially from the fastener's body 7. The fastener further includes a ring 73 concentric with the fastener's central axis when secured in place by the spokes 71. The spokes 71 are sufficiently thin so as to provide slots 75 which are sufficiently lodged to accept a conventional tie strap 79. As illustrated in FIG. 8, the stackable fastener of the present invention can affix to a substrate 77, be stacked upon one another, and affix elongate objects such as cables 81.

The stackable fastener 1 is preferably made of plastic. Acceptable plastics include thermal plastics such as ABS, polyvinyl chloride, polyethylene, styrene, and nylon. Thermosetting plastics such as polyester and silicon are also acceptable. In a preferred embodiment, the stackable fastener is made of a woven polyamide. Alternative materials including composites or metals including steel, aluminum, titanium and alloys may also be selected by those skilled in the art. Furthermore, a combination of these materials may be employed to obtain the mechanical properties desired.

While several particular forms of the invention have been illustrated and described, it will be apparent that various modifications can be made without departing from the spirit and scope of the invention. Therefore, it is not intended that the invention be limited except by the following claims.

Having described my invention in such terms so as to enable persons skilled in the art to understand the invention, recreate the invention and practice it, and having presently identified the presently preferred embodiments thereof, I claim:

1. A stackable fastener comprising:
a body having an annular shape including a central bore defining a central axis, said bore having a distal end and a proximal end, said bore forming an opening at its proximal end with said central bore being tapered to have a diameter smaller at the bore's proximal end than the bore's distal end;
a plurality of flexible fingers extending axially and distally from said body at said bore's distal extremity;
a force member within said bore and fingers and rotatable about said body's central axis, said force member forcing said fingers radially outward when said force member is rotated to a first rotational position to push said fingers outward, and said fingers retracting inward when said force member is rotated to a second rotational position to not push said fingers outward in said central bore; and
said fingers and bore constructed so that the stackable fastener is stackable upon like stackable fasteners wherein said fingers are sized to slide through a stackable fastener's opening into a stackable fastener's central bore when said force member is positioned in the second rotational position and said fingers are positioned inward, and said fingers are sized to lock within a stackable fastener's central bore when said force member is positioned in the first rotational position and said fingers are positioned outward.

2. The stackable fastener of claim 1 further comprising:
a plurality of spaces, including a space between each of said plurality of flexible fingers; and
said force member having proximal and distal ends with said distal end being constructed as a rotatable cam including a plurality of projections, said projections pushing said fingers radially outward when said force member is rotated to a first rotational position to push said fingers outward, and said projections residing within said spaces when said force member is rotated to a second rotational position to not push said fingers outward.

3. The stackable fastener of claim 1 wherein:
said force member is axially slideable within said bore and fingers, said force member pushing said fingers radially outward when said force member is rotated to move said force member axially to said first position to push said fingers outward and said fingers positioned inward when said force member is rotated to move said force member axially to said second position to not push said fingers outward.

4. The stackable fastener of claim 1 further comprising:
a plurality of spokes radially projecting from said body;
a ring concentric with said body;
said spokes engaging and radiating radially inward from said ring to engage said body to form a plurality of hollow slots with the periphery of each of said slots being defined by said body, a pair of adjacent spokes and said ring so that said slots form bores permitting the passage of objects.

5. A stackable fastener comprising:
a body having an annular shape including a central bore defining a central axis, said bore having a distal end and a proximal end, said bore forming an opening at its proximal end with said central bore being tapered to have a diameter smaller at the bore's proximal end than the bore's distal end;
a plurality of flexible fingers extending axially and distally from said body at said bore's distal extremity;
a plurality of spaces, including a space between each of said plurality of flexible fingers;
a force member within said bore and fingers and rotatable about said body's central axis;
said force member having proximal and distal ends with said distal end being constructed as a rotatable cam including a plurality of projections, said projections pushing said fingers radially outward when said force member is rotated to a first rotational position to push said fingers outward, and said projections residing within said spaces when said force member is rotated to a second rotational position to not push said fingers outward; and
said fingers and tapered bore constructed so that the stackable fastener is stackable upon like stackable fasteners wherein said fingers are sized to slide through a stackable fastener's opening into a stackable fastener's central bore when said force member is positioned in the second rotational position and said fingers are positioned inward, and said fingers are sized to lock within a stackable fastener's central bore when said force member is positioned in the first rotational position and said fingers are positioned outward.

6. The stackable fastener of claim 5 further comprising:
a locking means for locking said force member into the first position.

7. The stackable fastener of claim 5 further comprising:
a plurality of spokes radially projecting from said body;
a ring concentric with said body;
said spokes engaging and radiating radially inward from said ring to engage said body to form a plurality of hollow slots with the periphery of each of said slots being defined by said body, a pair of adjacent spokes and said ring so that said slots form bores permitting the passage of objects.

8. A stackable fastener comprising:

a body having an annular shape including a central bore defining a central axis, said bore having a distal end and a proximal end, said bore forming an opening at its proximal end with said central bore being tapered to have a diameter smaller at the bore's proximal end than the bore's distal end;

a plurality of flexible fingers extending axially and distally from said body at said bore's distal extremity;

a force member rotatable about said bore's central axis and axially slideable within said bore and fingers, said force member pushing said fingers radially outward when said force member is rotated and axially positioned in a first position to engage said fingers and said fingers positioned inward when said force member is rotated and axially positioned in a second position in said central bore; and said tapered central bore and fingers constructed so that the stackable fastener is stackable upon like stackable fasteners wherein said fingers are sized to slide through a stackable fastener's opening into a stackable fastener's tapered bore when said force member is positioned in said second position and said fingers are positioned inward, and said fingers are sized to lock within a stackable fastener's tapered central bore when said force member is positioned in said first position and said fingers are positioned outward.

9. The stackable fastener of claim 8 further comprising:

a plurality of spokes radially projecting from said body;

a ring concentric with said body;

said spokes engaging and radiating radially inward from said ring to engage said body to form a plurality of hollow slots with the periphery of each of said slots being defined by said body, a pair of adjacent spokes and said ring so that said slots form bores permitting the passage of objects;

said spokes engaging and radiating radially inward from said ring to engage said body to form a plurality of hollow slots with the periphery of each of said slots being defined by said body, a pair of adjacent spokes and said ring so that said slots form bores permitting the passage of objects.

10. The stackable fastener of claim 8 further comprising:

a locking means for locking said force member into the first position.

\* \* \* \* \*